US009649709B2

(12) United States Patent
Tuboguchi

(10) Patent No.: US 9,649,709 B2
(45) Date of Patent: May 16, 2017

(54) NUMERICAL CONTROL APPARATUS FOR CONTROLLING WIRE ELECTRIC DISCHARGE MACHINE WHICH PERFORMS TAPER MACHINING

(71) Applicant: FANUC Corporation, Minamitsuru-gun, Yamanashi (JP)

(72) Inventor: Yuji Tuboguchi, Minamitsuru-gun (JP)

(73) Assignee: FANUC Corporation, Minamitsuru-gun, Yamanashi (JP)

( * ) Notice: Subject to any disclaimer, the term of this patent is extended or adjusted under 35 U.S.C. 154(b) by 266 days.

(21) Appl. No.: 14/471,455

(22) Filed: Aug. 28, 2014

(65) Prior Publication Data

US 2015/0069022 A1    Mar. 12, 2015

(30) Foreign Application Priority Data

Sep. 9, 2013    (JP) .................................. 2013-186726

(51) Int. Cl.
| | | |
|---|---|---|
| B23H 1/02 | (2006.01) | |
| B23H 7/02 | (2006.01) | |
| B23H 7/10 | (2006.01) | |
| B23H 7/18 | (2006.01) | |
| B23H 7/06 | (2006.01) | |

(52) U.S. Cl.
CPC .................. *B23H 1/02* (2013.01); *B23H 7/02* (2013.01); *B23H 7/065* (2013.01); *B23H 7/105* (2013.01); *B23H 7/18* (2013.01); *G05B 2219/45221* (2013.01)

(58) Field of Classification Search
CPC ... B23H 1/02; B23H 7/02; B23H 7/10; B23H 7/105; B23H 7/18
See application file for complete search history.

(56) References Cited

U.S. PATENT DOCUMENTS

| | | | | |
|---|---|---|---|---|
| 4,460,816 A | * | 7/1984 | Bonga ...................... | B23H 7/06 219/69.12 |
| 4,883,934 A | * | 11/1989 | Mamin ..................... | B23H 7/06 204/224 M |
| 5,015,814 A | * | 5/1991 | Morishita ............... | B23H 11/00 219/69.12 |
| 5,030,819 A | * | 7/1991 | Borsari .................. | B23H 7/065 219/69.12 |

(Continued)

FOREIGN PATENT DOCUMENTS

| | | |
|---|---|---|
| JP | S56-102433 A | 8/1981 |
| JP | H01-257525 A | 10/1989 |

(Continued)

OTHER PUBLICATIONS

Decision to Grant a Patent issued Nov. 10, 2015 in Japanese Patent Application No. 2013-186726 (3 pages) with English translation (3 pages).

(Continued)

*Primary Examiner* — Ryan Reis
(74) *Attorney, Agent, or Firm* — Drinker Biddle & Reath LLP

(57) ABSTRACT

When a Z axis is moved while interrupting or continuing taper machining, a wire electric discharge machining control apparatus controls position of a UV axis by re-creating a taper deviation vector, based on a distance between upper and lower guides, such that a wire tilt angle does not change.

3 Claims, 7 Drawing Sheets

(56) References Cited

U.S. PATENT DOCUMENTS

| | | | | |
|---|---|---|---|---|
| 6,998,561 B2* | 2/2006 | Kato | ................ | B23H 7/065 |
| | | | | 219/69.12 |
| 7,211,762 B2* | 5/2007 | Kinoshita | ................ | B23H 7/04 |
| | | | | 219/69.12 |
| 7,371,989 B2* | 5/2008 | Miyajima | ................ | B23H 7/065 |
| | | | | 219/69.12 |
| 2005/0115928 A1* | 6/2005 | Arakawa | ................ | B23H 7/02 |
| | | | | 219/69.12 |
| 2007/0068905 A1 | 3/2007 | Miyajima et al. | | |

FOREIGN PATENT DOCUMENTS

| | | |
|---|---|---|
| JP | H08-52621 A | 2/1996 |
| JP | 2000-235408 A | 8/2000 |
| JP | 2002018647 A | 1/2002 |

OTHER PUBLICATIONS

Extended European Search Report dated Apr. 16, 2015 in corresponding European Patent Application No. 14182201.5.
Notification of Reasons for Refusal issued Jun. 30, 2015 in Japanese Patent Application No. 2013-186726 (4 pages) with English translation (4 pages).

\* cited by examiner

MOVE Z AXIS MANUALLY BY
MAINTAINING WIRE TILT ANGLE

POSITION WHERE
MACHINING IS
INTERRUPTED

CUTOFF

NUMERICAL CONTROL APPARATUS FOR CONTROLLING WIRE ELECTRIC DISCHARGE MACHINE WHICH PERFORMS TAPER MACHINING

RELATED APPLICATION DATA

This application claims priority under 35 U.S.C. §119 and/or §365 to Japanese Application No. 2013-186726 filed Sep. 9, 2013, the entire contents is incorporated herein by reference.

BACKGROUND OF THE INVENTION

Field of the Invention

The present invention relates to a numerical control apparatus for controlling a wire electric discharge machine which performs taper machining.

Description of the Related Art

FIG. 7 is a diagram describing taper machining performed by a wire electric discharge machine. When taper machining is performed using a wire electric discharge machine, a distance between upper and lower guides L is set before the start of machining. The distance between upper and lower guides L is a vertical distance between a lower wire guide 112 and upper wire guide 111. A taper deviation vector T of a UV axis is calculated from the distance between upper and lower guides L, a wire tilt angle command θ, and a wire tilt direction command θ and position of the UV axis is controlled such that the wire tilt angle and wire tilt direction conform to command values.

Japanese Patent Laid-Open No. 1-257525 discloses wire cut electric discharge machining method which reads position of the upper guide from an NC program when a Z axis moves in response to an automatic operation command during automatic operation, i.e., during taper machining, calculates height from a table surface to the upper guide based on the read data, and calculates taper data.

FIG. 8 is a diagram describing an issue arising if the Z axis is moved while interrupting or continuing taper machining. If the Z axis is moved while interrupting or continuing taper machining, a discrepancy occurs between the distance between upper and lower guides L set before the start of machining and actual distance between upper and lower guides. Consequently, the wire tilt angle does not conform to the command. Therefore, if the Z axis is moved while interrupting or continuing taper machining, it is not possible to just proceed with the taper machining.

Thus, for example, on a taper machining block, it is not possible to carry out cutoff machining using a core fall prevention jig such as a magnet, i.e., carry out cutoff machining by manually raising the Z axis and mounting the jig. Also, a workpiece whose plate thickness changes cannot be taper-machined by moving up and down the Z axis.

Japanese Patent Laid-Open No. 1-257525 does not disclose a method for controlling the position of the UV axis in such a way that the wire tilt angle does not change when the Z axis is moved manually during automatic operation, i.e., during taper machining. This is apparent from the following descriptions:

"It is determined whether the Z axis is moved automatically or manually (S1) if the Z axis is moved automatically and the T–U value (distance between the table surface and upper guide) of the electric discharge machine is stored in the memory of the NC (numerical calculation) device side (S2), taper data is calculated via T–U value calculation (S3)." (bottom line, upper left column, page 2);

"On the other hand, if the Z axis is moved manually in S1, the height of the upper guide is entered manually (S21). Subsequent actions are similar to conventional ones" (line 5, lower right column, page 2); and The "T–U value calculation" and "taper data calculation" in S3 in FIG. 1 are performed only when it is determined in S1 that the Z axis is moved automatically.

Also, no method is disclosed for controlling the position of the UV axis in such a way that the wire tilt angle does not change when the Z axis is moved in response to an automatic operation command during automatic operation, i.e., during taper machining.

SUMMARY OF THE INVENTION

Thus, an object of the present invention is to provide a numerical control apparatus for controlling a wire electric discharge machine which performs taper machining, where the numerical control apparatus allows the wire electric discharge machine to just proceed with machining after the Z axis is moved with a wire tilt angle maintained while interrupting or continuing taper machining.

For that, if the Z axis is moved while interrupting or continuing taper machining, the numerical control apparatus controls position of a UV axis by updating a distance between upper and lower guides and re-creating a taper deviation vector such that the wire tilt angle does not change.

The present invention provides a wire electric discharge machining control apparatus for a wire electric discharge machine, including: an XY axis configured to move a workpiece in a horizontal direction relative to a wire, a UV axis configured to move one of upper and lower wire guides in the horizontal direction, and a Z axis configured to move one of the upper and lower wire guides in a vertical direction, and the wire electric discharge machining control apparatus is configured to perform taper machining so that a wire tilt angle and a wire tilt direction match a specified wire tilt angle and a specified wire tilt direction, the wire electric discharge machining control apparatus comprising: a wire tilt angle calculation unit configured to calculate a wire tilt angle, when the Z axis is moved while interrupting or continuing taper machining, the wire tilt angle being the one existing before the Z axis is moved; an upper and lower guides distance calculation unit configured to calculate a distance between upper and lower guides between the upper and lower wire guides, from a machine coordinate position of the Z axis; a taper deviation vector calculation unit configured to calculate a taper deviation vector based on the distance between upper and lower guides, the taper deviation vector being a horizontal deviation of the UV axis from the XY axis and defining a location at which the wire tilt angle calculated by the wire tilt angle calculation unit is maintained; and a UV axis position control unit configured to find a position at which the UV axis is spaced away from the XY axis by a distance defined by the taper deviation vector and thereby move the UV axis.

The wire tilt angle calculation is further configured to find the taper deviation vector between the upper and lower wire guides from the machine coordinate position of the UV axis and find the wire tilt angle from the taper deviation vector and the distance between upper and lower guides.

When machining is carried out based on a machining program, the wire tilt angle calculation unit may find the wire tilt angle based on the machining program.

Being configured as described above, the present invention can provide a numerical control apparatus for controlling a wire electric discharge machine which performs taper machining, where the numerical control apparatus allows the wire electric discharge machine to just proceed with machining after the Z axis is moved with a wire tilt angle maintained while interrupting or continuing taper machining.

BRIEF DESCRIPTION OF THE DRAWINGS

The above and other objects and features of the present invention will become more apparent from the following description of the embodiments taken in conjunction with the accompanying drawings, wherein.

DETAILED DESCRIPTION OF THE PREFERRED EMBODIMENTS

Figure 1:
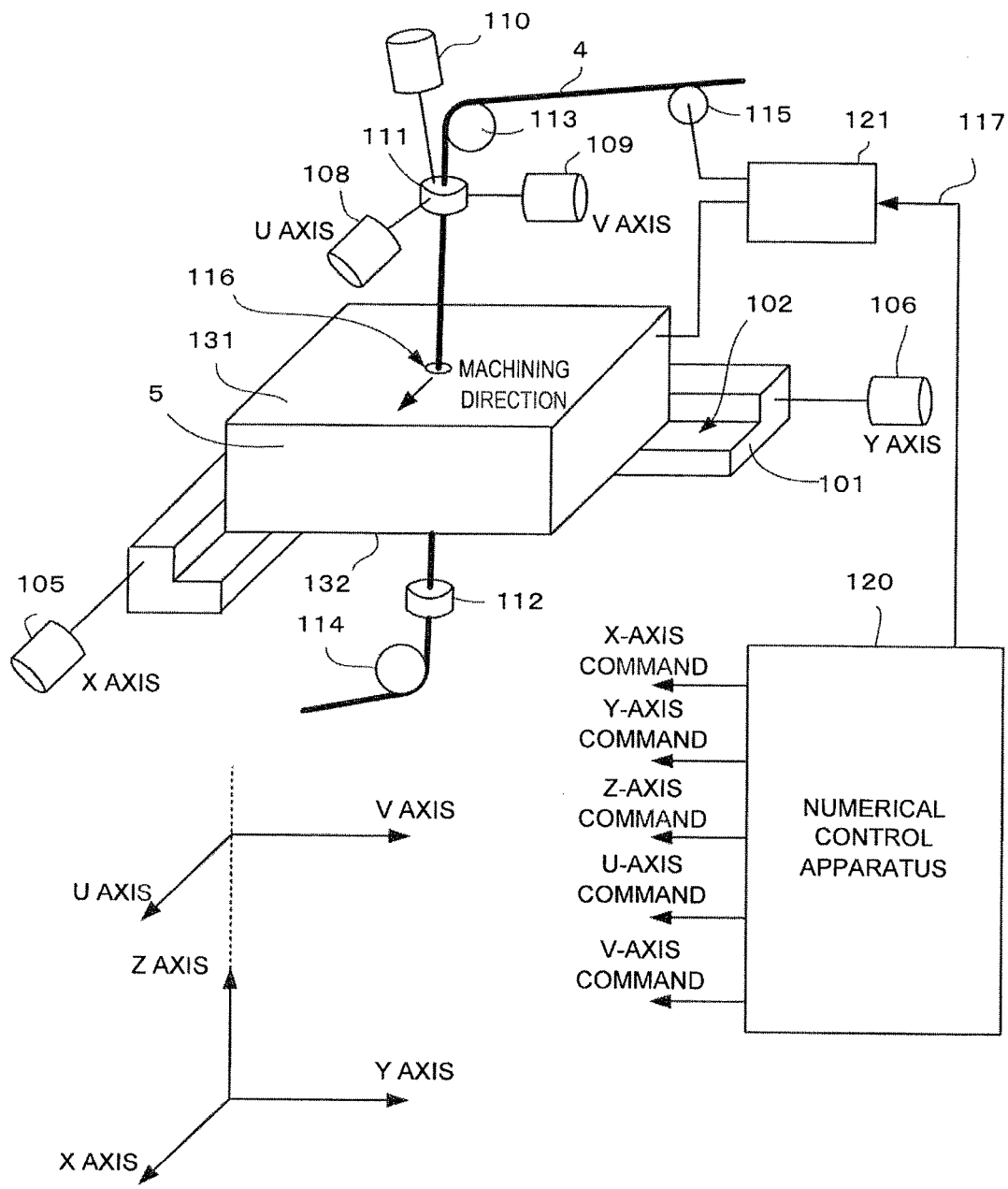
FIG. 1 is a diagram describing a configuration of a wire electric discharge machine.

FIG. 1 is a diagram describing a configuration of a wire electric discharge machine. Reference numeral 101 denotes a workpiece holder on which a workpiece 5 to be machined is mounted and fixed. The workpiece holder 101 has a mounting surface 102 with precise flatness. During machining, the workpiece 5 is mounted and fixed to the workpiece holder 101 such that a bottom face of the workpiece 5 is placed in contact with the mounting surface 102.

To perform electric discharge machining of the workpiece 5, a wire electrode 4 is fed from a wire electrode delivery reel (not shown) to a machining zone 116 through a feed roller 115, upper guide roller 113, and upper wire guide 111. During machining, the wire electrode 4 is stretched between the upper wire guide 111 and lower wire guide 112 by manipulating a connection and a voltage is applied to produce electric discharges between the wire electrode 4 and workpiece 5.

After passing through the machining zone 116 and further through the lower wire guide 112 and a lower guide roller 114, the wire electrode 4 is wound up by a take-up reel (not shown) adapted to pull the wire electrode 4 with a predetermined tensile force. Note that the wire electrode 4 may be recovered in a wire recovery box (not shown) instead of the take-up reel.

Electric energy for electric discharge machining is supplied to the wire electrode 4 from a machining power supply 121 via the feed roller 115 according to a pulse train 117 outputted from a numerical control apparatus 120. For the purpose of control, the number of pulses or value of an integral of a pulse current inputted from the machining power supply 121 can be treated as an amount of the energy. Also, cooling water is poured over the machining zone 116 or another technique is adopted such as immersing the entire workpiece 5 in a working fluid such as pure water, for example.

Most commonly, the mounting surface 102 of the workpiece holder 101 extends in a horizontal direction, i.e., on a plane parallel to an XY plane and the workpiece holder 101 is configured to be drivable by X-axis and Y-axis servomotors 105 and 106 on a plane parallel to an XY plane defined by the X axis and Y axis orthogonal to each other. Also, the upper wire guide 111 is configured to be drivable by U-axis and V-axis servomotors 108 and 109 on a plane parallel to the XY plane and drivable by a Z-axis servomotor 110 in a direction perpendicular to the XY plane, i.e., in a ±Z direction. Most commonly, a moving direction along the U axis and moving direction along the X axis are parallel to each other and a moving direction along the V axis and moving direction along the Y axis are parallel to each other. Note that current positions of respective drive shafts, i.e., the X axis, Y axis, Z axis, U axis, and V axis are stored as machine coordinate positions in a storage device of the numerical control apparatus 120. Machine coordinate position of the lower wire guide 112 is stored in advance as a parameter in the storage device of the numerical control apparatus 120.

The machining zone 116 can be change by changing relative position of the workpiece 5 and wire electrode 4, and the machining zone 116 is changed by commands for the servomotors of respective axes, i.e., an X-axis command, Y-axis command, Z-axis command, U-axis command, and V-axis command, outputted from the numerical control apparatus 120. Most commonly, details of the commands are prescribed by a machining program. The machining program prescribes move commands for the wire electrode 4, i.e., move commands for the servomotors of respective axes, and is defined on a plane parallel to the XY plane described above. The plane on which the machining program is defined can be set at an arbitrary position in a Z-axis direction. The plane set arbitrarily is referred to as a programming plane.

According to one embodiment of the present invention, in the wire electric discharge machine described above, when the Z axis is moved while interrupting or continuing taper machining, the position of a UV axis is controlled by updating the distance between upper and lower guides L according to the movement and re-creating the taper deviation vector such that the wire tilt angle θ does not change.

Figure 2:
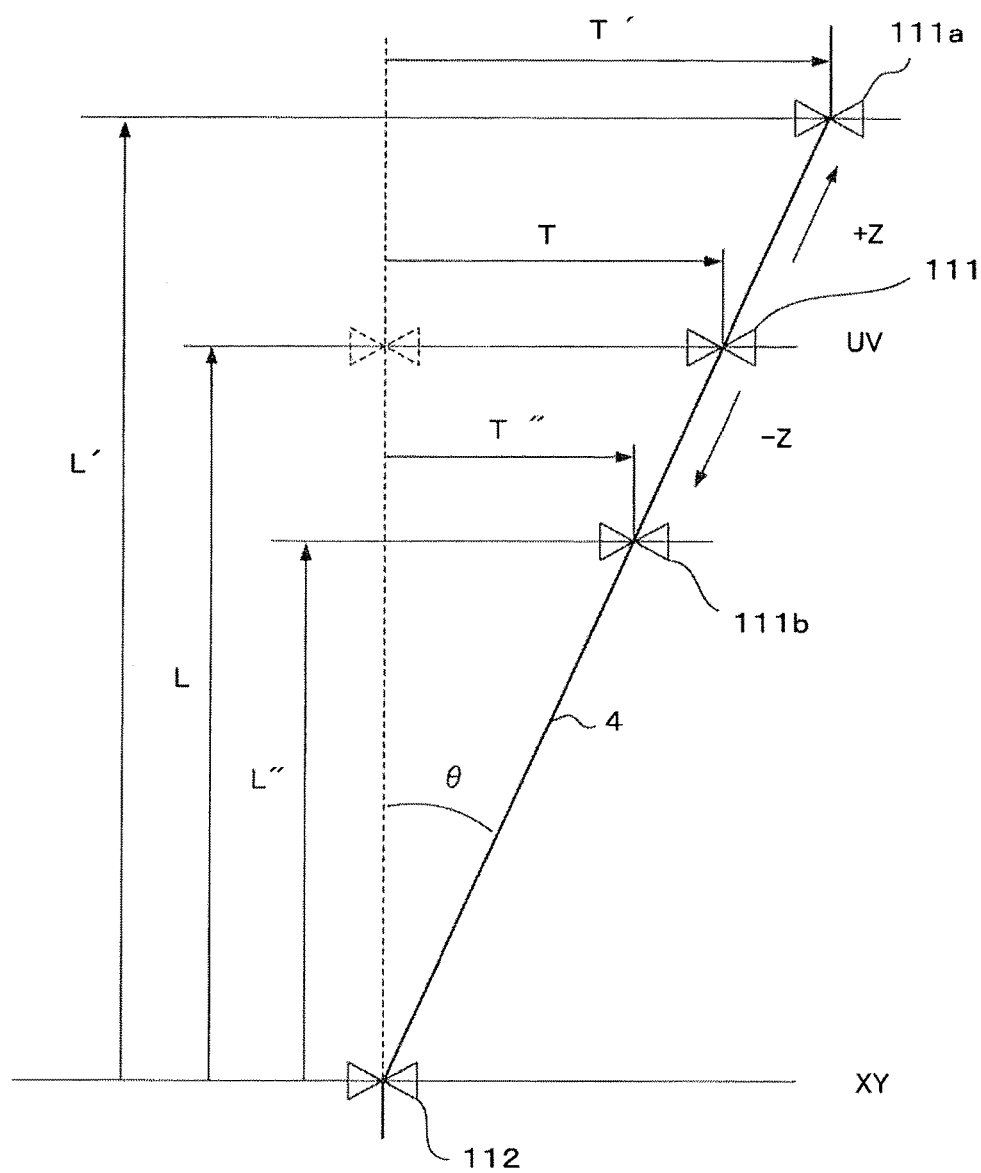
FIG. 2 is a diagram describing how position of a UV axis is controlled such that the wire tilt angle does not change when the Z axis is moved while interrupting or continuing taper machining.

Now the taper deviation vector will be described with reference to FIG. 2. In FIG. 2, a direction perpendicular to the plane formed by the XY axis is designated as the Z-axis direction. FIG. 2 is a diagram describing how the position of the UV axis is controlled such that the wire tilt angle θ does not change when the Z axis is moved while interrupting or continuing taper machining.

When the upper wire guide is located at a position indicated by 111, the distance between upper and lower guides in the Z-axis direction is L. In this case, the taper deviation vector is indicated by T in FIG. 2. That is, the taper deviation vector T is defined as a vector whose start point is an intersecting point between the UV plane and the Z axis and whose end point is a machine coordinate position on the U axis and V axis, the UV plane being formed by the UV axis. Also, the wire tilt angle θ is defined as an angle formed at the position of the lower wire guide 112 by a line parallel to the Z axis and the wire electrode 4, the angle being a vertex angle of a triangle formed by three points: the position of an intersection point between a line passing through the lower wire guide 112 in parallel to the Z axis and the plane formed by the UV axis, the position of the end point of the taper deviation vector, and the position of the lower wire guide 112.

The upper wire guide 111 is moved to a position indicated by 111a. In this case, the distance between upper and lower guides is L'. The taper deviation vector is indicated by T'. Also, the upper wire guide 111 is moved to a position indicated by 111b. In this case, the distance between upper and lower guides is L". The taper deviation vector is indicated by T". As shown in FIG. 2, the position of the upper wire guide 111 moves in the UV-axis direction in synchronization with the movement of the upper wire guide 111 in the Z-axis direction based on the taper deviation vector, making it possible to keep the tilt angle of the wire electrode 4, i.e., the wire tilt angle θ, unchanged.

Figure 3A:
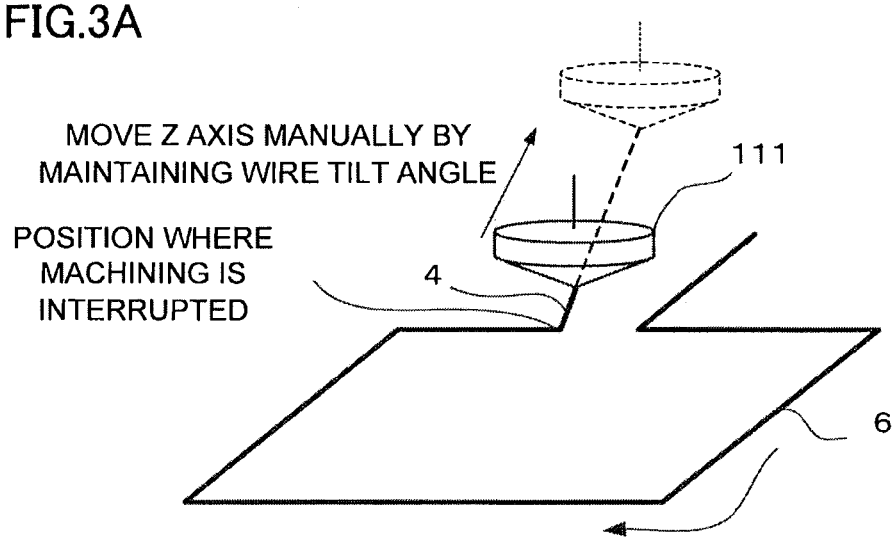
FIGS. 3A and 3B are diagrams describing how it is possible to interrupt taper machining, move the Z axis by manual operation with the wire tilt angle maintained, and just proceed with machining.
Figure 3B:
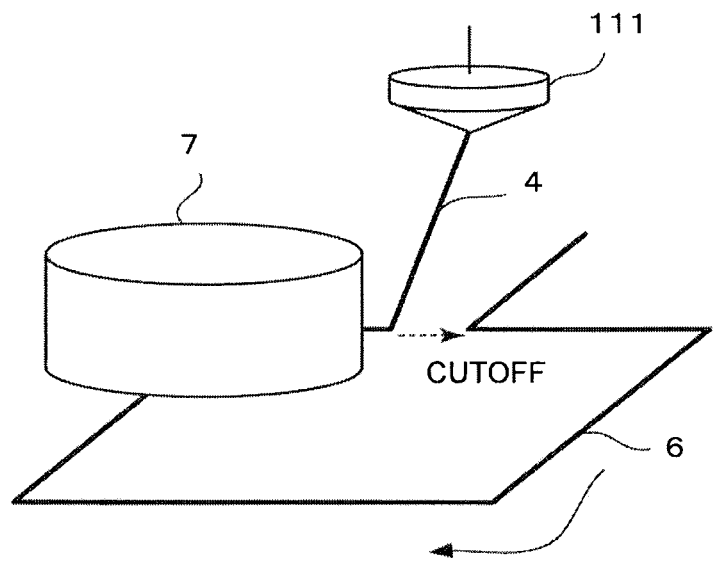

FIGS. 3A and 3B are diagrams describing how it is possible to interrupt taper machining, move the Z axis by manual operation with the wire tilt angle maintained, and just proceed with machining. As shown in FIG. 3A, the workpiece 5 is machined along a machining path 6 by the wire electrode 4.

Taper machining is interrupted at a position shown in FIG. 3A.

With the wire tilt angle maintained, the upper wire guide 111 is moved manually upward along the Z axis. This, makes it possible, as shown in FIG. 3B, to carry out cutoff machining on a taper machining block using a core fall prevention jig 7 such as a magnet, i.e., for example, to carry out cutoff machining after attaching the jig to a core by manually raising the Z axis. In this way, machining can be carried out after the Z axis is moved with a wire tilt angle maintained while interrupting or continuing taper machining.

Figure 4:
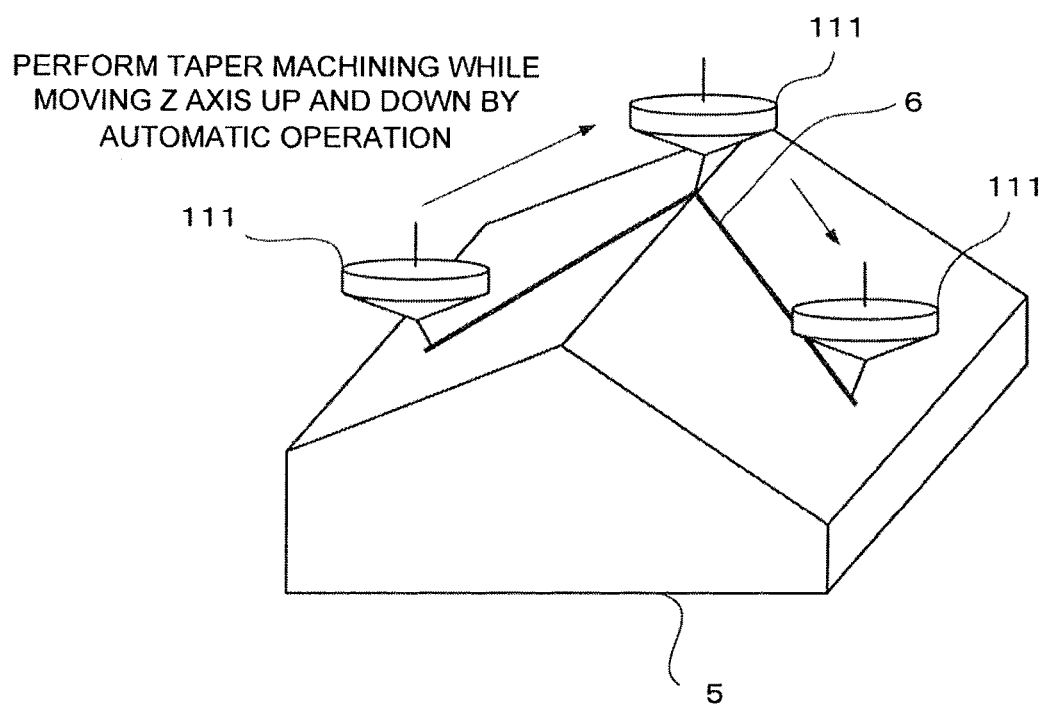
FIG. 4 is a diagram describing how a workpiece whose plate thickness changes is taper-machined with high accuracy by moving up and down the Z axis by automatic operation.

FIG. 4 is a diagram describing how a workpiece whose plate thickness changes is taper-machined with high accuracy by moving up and down the Z axis by automatic operation. The workpiece 5 whose plate thickness changes can be taper-machined with high accuracy, by moving up and down the Z axis in synchronization with movement of the wire electrode 4 from left to right relative to the workpiece 5, by automatic operation.

Figure 5:
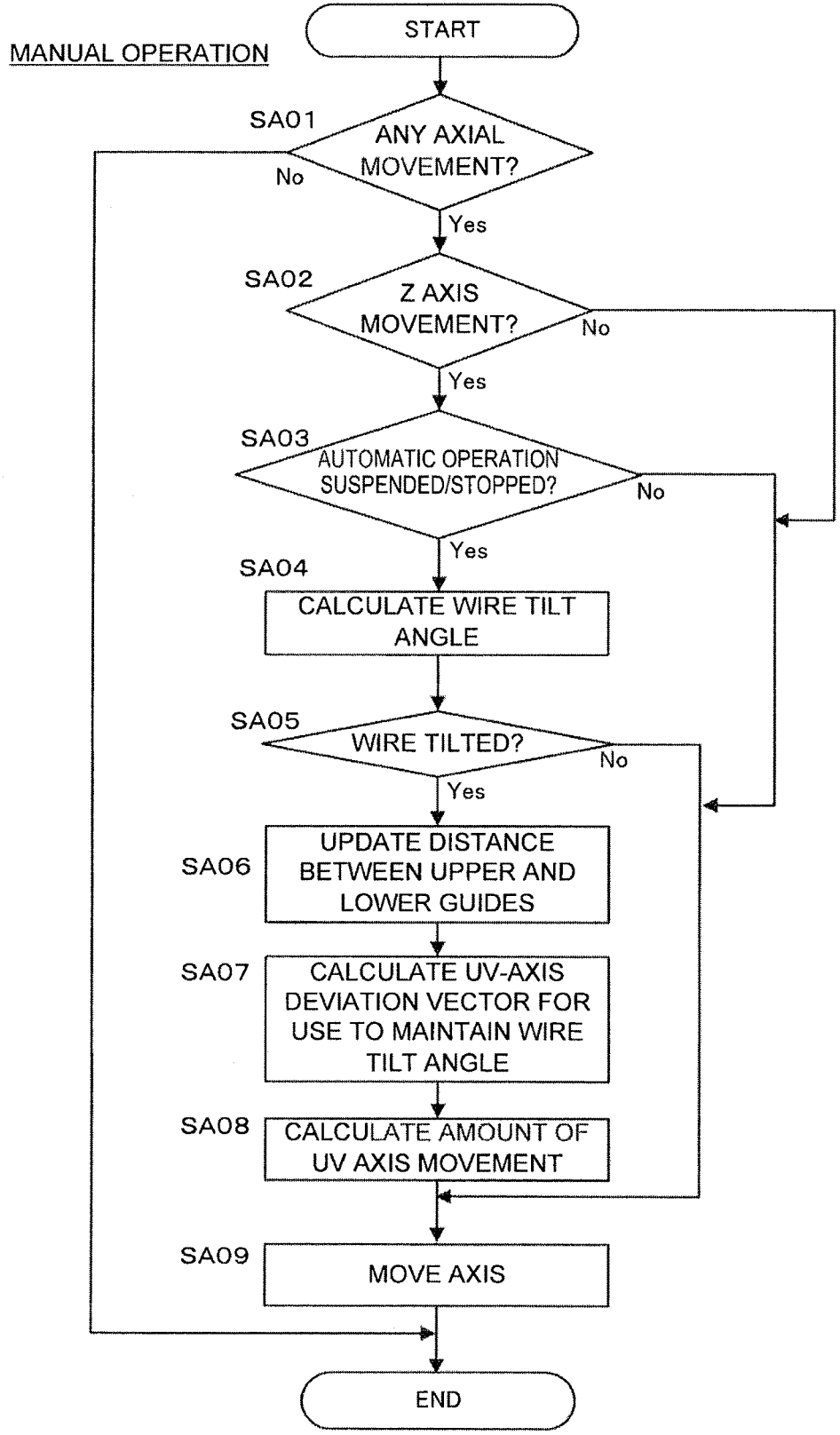
FIG. 5 is a diagram describing a process performed during manual operation.

FIG. 5 is a diagram describing a process performed during manual operation. The process will be described below on a step by step basis.

[Step SA01] It is determined whether or not there is any manual axial movement command. If there is an axial movement command (YES), the flow goes to step SA02, and if there is no axial movement command (NO), the processing is finished.

[Step SA02] It is determined whether or not the axial movement concerns the Z axis. If the axial movement concerns the Z axis (YES), the flow goes to step SA03, and if the axial movement does not concern the Z axis (NO), the flow goes to step SA09.

[Step SA03] It is determined whether or not automatic operation is suspended or stopped. If automatic operation is suspended or stopped (YES), the flow goes to step SA04, and if automatic operation is not suspended or stopped (NO), the flow goes to step SA09.

[Step SA04] The wire tilt angle is calculated.

[Step SA05] It is determined whether or not the wire electrode 4 is tilted. If the wire electrode 4 is tilted (YES), the flow goes to step SA06, and if the wire electrode 4 is not tilted (NO), the flow goes to step SA09.

[Step SA06] The distance between the upper and lower wire guides is updated.

[Step SA07] A UV-axis deviation vector for use to maintain the tilt angle of the wire electrode 4 is calculated.

[Step SA08] An amount of movement on the UV axis is calculated.

[Step SA09] The axial movement is performed and the processing is finished.

Figure 6:
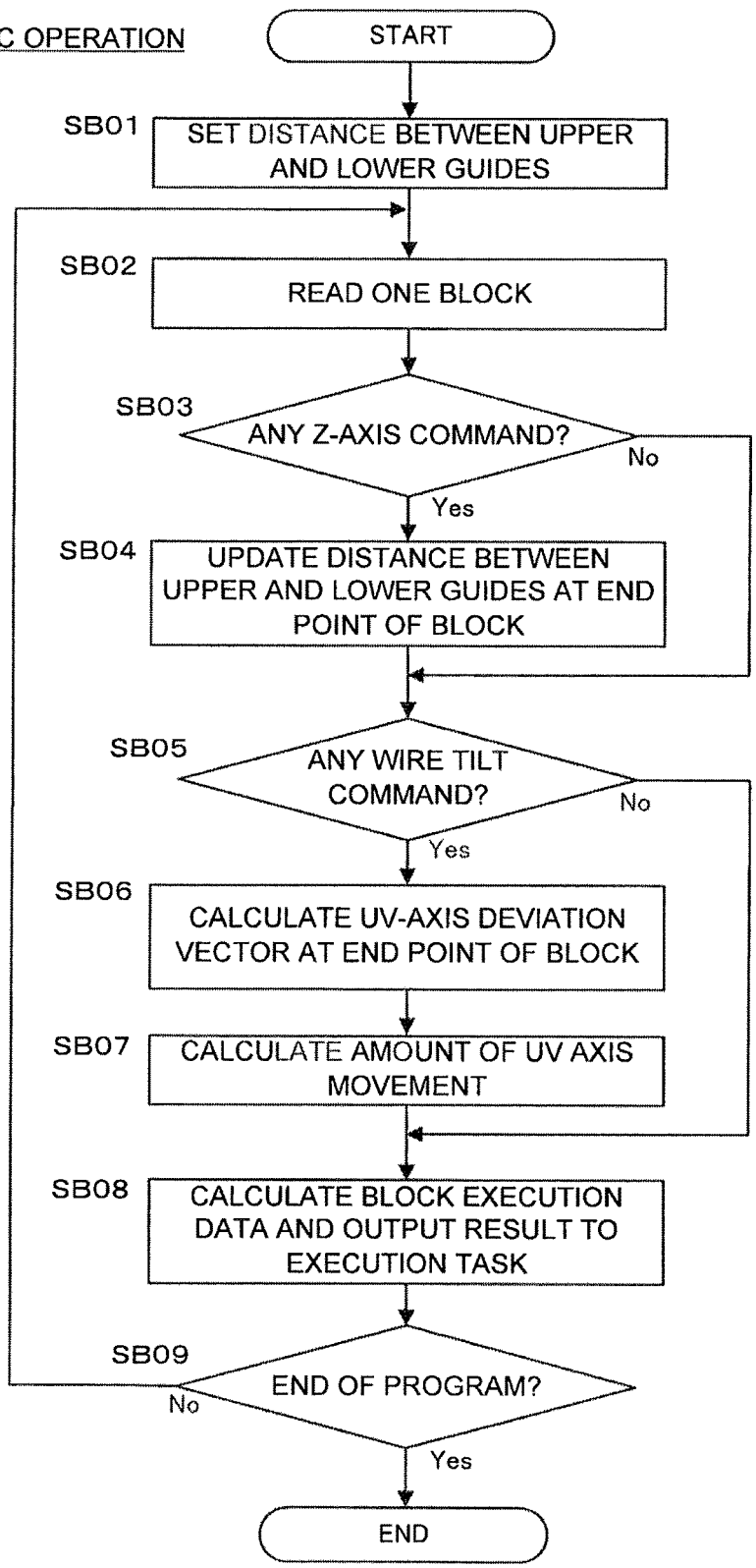
FIG. 6 is a diagram describing a process performed during automatic operation.
Figure 7:
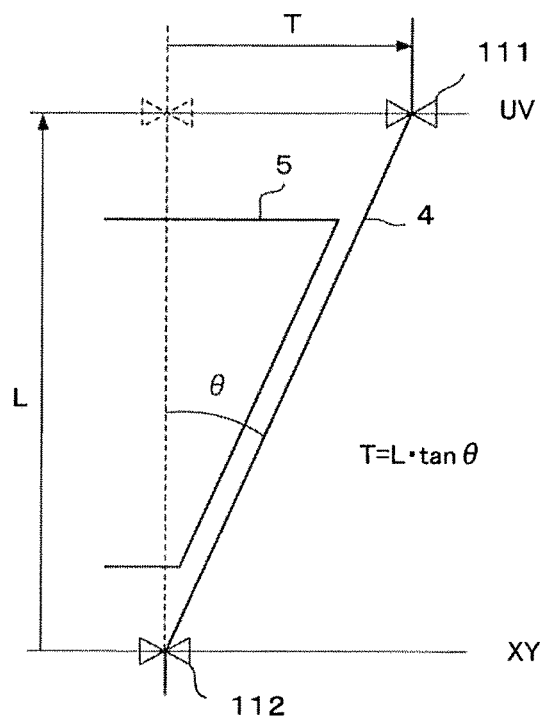
FIG. 7 is a diagram describing taper machining performed by the wire electric discharge machine.
Figure 8:
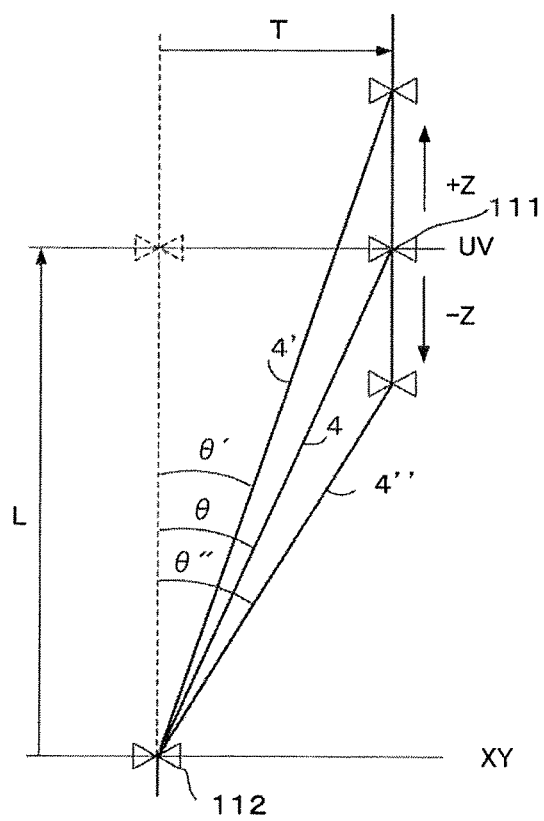
FIG. 8 is a diagram describing an issue arising if the Z axis is moved while interrupting or continuing taper machining.

FIG. 6 is a diagram describing a process performed during automatic operation. The process will be described below on a step by step basis.

[Step SB01] The distance between the upper and lower wire guides is set. That is, the distance between the upper and lower wire guides prestored as a parameter in the control apparatus is read out.

[Step SB02] One block is read out.

[Step SB03] It is determined whether or not the command in the block read in step SB02 is a Z-axis command. If the command is a Z-axis command (YES), the flow goes to step SB04, and if the command is not a Z-axis command (NO), the flow goes to step SB05.

[Step SB04] The distance between the upper and lower wire guides at the end point of the block is updated.

[Step SB05] It is determined whether or not the command in the one block read in step SB02 is a wire electrode tilt command. If the command is a wire electrode tilt command (YES), the flow goes to step SB06, and if the command is not a wire electrode tilt command (NO), the flow goes to step SB08.

[Step SB06] The UV-axis deviation vector at the end point of the block read in step SB02 is calculated.

[Step SB07] The amount of movement on the UV axis is calculated.

[Step SB08] Block execution data is calculated, a calculation result is outputted to an execution task, and the flow goes to step SB09.

[Step SB09] It is determined whether or not the program has reached its end. If the program has reached its end (YES), the processing is finished, and if the program has not reached its end yet (NO), the flow returns to step SB02.

Note that the numerical control apparatus 120 adapted to control the wire electric discharge machine configured to be able to perform taper machining and described with reference to FIG. 1 is an example of "a wire electric discharge machining control apparatus for a wire electric discharge machine, including: an XY axis configured to move a workpiece in a horizontal direction relative to a wire; a UV axis configured to move one of upper and lower wire guides in the horizontal direction; and a Z axis configured to move one of the upper and lower wire guides in a vertical direction; and the wire electric discharge machining control apparatus configured to perform taper machining so that a wire tilt angle and a wire tilt direction match a specified wire tilt angle and a specified wire tilt direction" in claim 1.

Step SA04 in the flowchart of FIG. 5 and step SB05 in the flowchart of FIG. 6 are examples of "a wire tilt angle calculation unit configured to calculate a wire tilt angle, when the Z axis is moved while interrupting or continuing taper machining, the wire tilt angle being the one existing before the Z axis is moved" in claim 1.

Step SA06 in the flowchart of FIG. 5 and step SB04 in the flowchart of FIG. 6 are examples of "an upper and lower guides distance calculation unit configured to calculate a distance between upper and lower guides between the upper and lower wire guides from a machine coordinate position of the Z axis" in claim 1.

Step SA07 in the flowchart of FIG. 5 and step SB06 in the flowchart of FIG. 6 are examples of "a taper deviation vector calculation unit configured to calculate a taper deviation vector based on the distance between upper and lower guides, the taper deviation vector being a horizontal deviation of the UV axis from the XY axis and defining a location at which the wire tilt angle calculated by the wire tilt angle calculation unit is maintained" in claim 1.

Step SA09 in the flowchart of FIG. 5 and step SB08 in the flowchart of FIG. 6 are examples of "a UV axis position control unit configured to find a position at which the UV axis is spaced away from the XY axis by a distance defined by the taper deviation vector and thereby moving the UV axis" in claim 1.

Claim 2 includes step SA04 in the flowchart of FIG. 5, where step SA04 involves finding the taper deviation vector between the upper and lower wire guides from the machine coordinate position of the UV axis and finding the wire tilt angle from the taper deviation vector and the distance between upper and lower guides.

Claim 3 includes step SB05 in the flowchart of FIG. 6, where step SB05 involves using the wire tilt angle specified in the machining program when carrying out machining based on the machining program.

What is claimed is:

1. A wire electric discharge machining control apparatus for a wire electric discharge machine, including:
   an XY axis configured to move a workpiece in a horizontal direction relative to a wire;
   a UV axis configured to move one of upper and lower wire guides in the horizontal direction; and
   a Z axis configured to move one of the upper and lower wire guides in a vertical direction; and configured to perform taper machining so that a wire tilt angle and a wire tilt direction match a specified wire tilt angle and a specified wire tilt direction, the wire electric discharge machining control apparatus comprising:
   a wire tilt angle calculation unit configured to calculate a wire tilt angle after a start of taper machining, when one of the upper and lower wire guides is moved in a vertical direction by means of the Z axis while interrupting or continuing taper machining, the wire tilt angle being the one existing before one of the upper and lower wire guides is moved in the vertical direction by means of the Z axis;
   an upper and lower guides distance calculation unit configured to calculate a distance between the upper and lower wire guides, from a machine coordinate position of the Z axis;
   a taper deviation vector calculation unit configured to calculate a taper deviation vector based on the distance between upper and lower guides, the taper deviation vector being a horizontal deviation of the UV axis from the XY axis and defining a location at which the wire tilt angle calculated by the wire tilt angle calculation unit is maintained; and
   a UV axis position control unit configured to find a position at which the UV axis is spaced away from the XY axis by a distance defined by the taper deviation vector and move one of the upper and lower wire guides in the horizontal direction by means of the UV axis.

2. The wire electric discharge machining control apparatus according to claim 1, the wire tilt angle calculation unit is further configured to find the taper deviation vector between the upper and lower wire guides from the machine coordinate position of the UV axis and find the wire tilt angle from the taper deviation vector and the distance between upper and lower guides.

3. The wire electric discharge machining control apparatus according to claim 1, the wire tilt angle calculation unit is further configured to find the wire tilt angle based on a machining program when machining is carried out based on the machining program.

\* \* \* \* \*